(12) United States Patent
Yun et al.

(10) Patent No.: US 9,068,896 B2
(45) Date of Patent: Jun. 30, 2015

(54) PROCESS INDEPENDENT TEMPERATURE SENSOR BASED ON OSCILLATOR

(75) Inventors: Seok Ju Yun, Daejeon (KR); Young-deuk Jeon, Daejeon (KR); Tae Moon Roh, Daejeon (KR); Jong-Kee Kwon, Daejeon (KR); Woo Seok Yang, Daejeon (KR); Jongdae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 13/620,594

(22) Filed: Sep. 14, 2012

(65) Prior Publication Data

US 2013/0156069 A1 Jun. 20, 2013

(30) Foreign Application Priority Data

Dec. 20, 2011 (KR) .................. 10-2011-0138234

(51) Int. Cl.
*G01K 11/00* (2006.01)
*G01K 7/32* (2006.01)

(52) U.S. Cl.
CPC ....................... *G01K 7/32* (2013.01)

(58) Field of Classification Search
USPC ................... 374/117, 170, 166, 112
See application file for complete search history.

(56) References Cited

U.S. PATENT DOCUMENTS

| | | | | |
|---|---|---|---|---|
| 4,537,515 | A | * | 8/1985 | Dinger et al. ............... 368/202 |
| 5,513,235 | A | * | 4/1996 | Douglass et al. ............. 377/25 |
| 5,899,570 | A | * | 5/1999 | Darmawaskita et al. ...... 374/170 |
| 6,731,181 | B2 | | 5/2004 | Fukayama et al. |
| 7,443,258 | B2 | * | 10/2008 | Hagelin .................... 331/156 |
| 7,804,372 | B2 | | 9/2010 | Nakatani |
| 7,961,033 | B2 | * | 6/2011 | Meninger et al. ............ 327/512 |

(Continued)

OTHER PUBLICATIONS

Poki Chen et al., "A Time-Domain SAR Smart Temperature Sensor With Curvature Compensation and a 3σ Inaccuracy of -0.4 ° C. · +0.6 ° C. Over a 0 ° C. to 90 ° C. Range", IEEE Journal of Solid-State Circuits, Mar. 2010, pp. 600-609, vol. 45, No. 3, IEEE.

(Continued)

*Primary Examiner* — Mirellys Jagan (57) ABSTRACT

The inventive concept discloses a new temperature sensor structure based on oscillator which is insensitive to a process change and improves an error rate of temperature output. The temperature sensor based on oscillator compares an oscillator circuit structure insensitive to a temperature change with an oscillator circuit structure having a frequency change in proportion to a temperature change to output a relative difference between the two oscillator circuit structures and thereby it is compensated itself. In the temperature sensor based on oscillator, a problem of performance reduction due to an external environment and a process deviation of temperature sensor is improved and an output distortion and temperature nonlinearity are effectively improved. Thus, since the temperature sensor based on oscillator has a structure of high performance, low power and low cost, it can be variously used in a detection equipment of temperature environment.

19 Claims, 6 Drawing Sheets

(56) References Cited

U.S. PATENT DOCUMENTS

| | | | |
|---|---|---|---|
| 7,982,550 B1* | 7/2011 | Quevy et al. | 331/176 |
| 8,258,880 B2 | 9/2012 | Koh et al. | |
| 2002/0150141 A1* | 10/2002 | Kishi | 374/141 |
| 2007/0195856 A1* | 8/2007 | Blom et al. | 374/117 |
| 2008/0238563 A1* | 10/2008 | Kim et al. | 331/176 |
| 2010/0141328 A1* | 6/2010 | Meninger et al. | 327/512 |
| 2012/0140792 A1* | 6/2012 | Yeh | 374/170 |
| 2012/0229220 A1* | 9/2012 | Quevy et al. | 331/41 |
| 2012/0306555 A1* | 12/2012 | Wu et al. | 327/175 |
| 2013/0208763 A1* | 8/2013 | Uwe et al. | 374/171 |
| 2015/0023388 A1* | 1/2015 | Tanabe | 374/117 |

OTHER PUBLICATIONS

Poki Chen et al., "A Fully Digital Time-Domain Smart Temperature Sensor Realized With 140 FPGA Logic Elements", IEEE Transactions on Circuits and Systems—I: Regular Papers, Dec. 2007, pp. 2661-2668, vol. 54, No. 12, IEEE.

Kyoungho Woo et al., "Dual-DLL-Based CMOS All-Digital Temperature Sensor for Microprocessor Thermal Monitoring", 2009 IEEE International Solid-State Circuits Conference, 2009, IEEE.

Poki Chen et al., "A Time-to-Digital-Converter-Based CMOS Smart Temperature Sensor", IEEE Journal of Solid-State Circuits, Aug. 2005, pp. 1642-1648, vol. 40, No. 8, IEEE.

* cited by examiner

PROCESS INDEPENDENT TEMPERATURE SENSOR BASED ON OSCILLATOR

CROSS-REFERENCE TO RELATED APPLICATIONS

This U.S. non-provisional patent application claims priority under 35 U.S.C. §119 of Korean Patent Application No. 10-2011-0138234, filed on Dec. 20, 2011, the entire contents of which are hereby incorporated by reference.

BACKGROUND

The present inventive concept herein relates to temperature sensing fields, and more particularly, to a process independent temperature sensor based on an oscillator.

A temperature sensor using a semiconductor device is classified into two types.

One type is a voltage-domain temperature sensor sensing a BJT (bipolar junction transistor) output current obtained through a BJT as an analog voltage proportional to a temperature, and then converting the analog voltage into a digital signal to output it.

The other type is a time-domain temperature sensor detecting a signal delay which changes depending on a temperature change and outputting the delay signal as a digital signal through a digital converter.

A recent temperature sensor has a high sensing accuracy by applying technologies of a dynamic element matching (DEM), an offset cancelation and a curvature correction. However, since applying the technologies complicates a chip of temperature sensor, complexity of chip makes it difficult to apply the chip of temperature sensor to a system on-chip (SoC). Complexity of chip makes it difficult to apply the chip of temperature sensor to a simple use and a mobile use.

Figure 1:
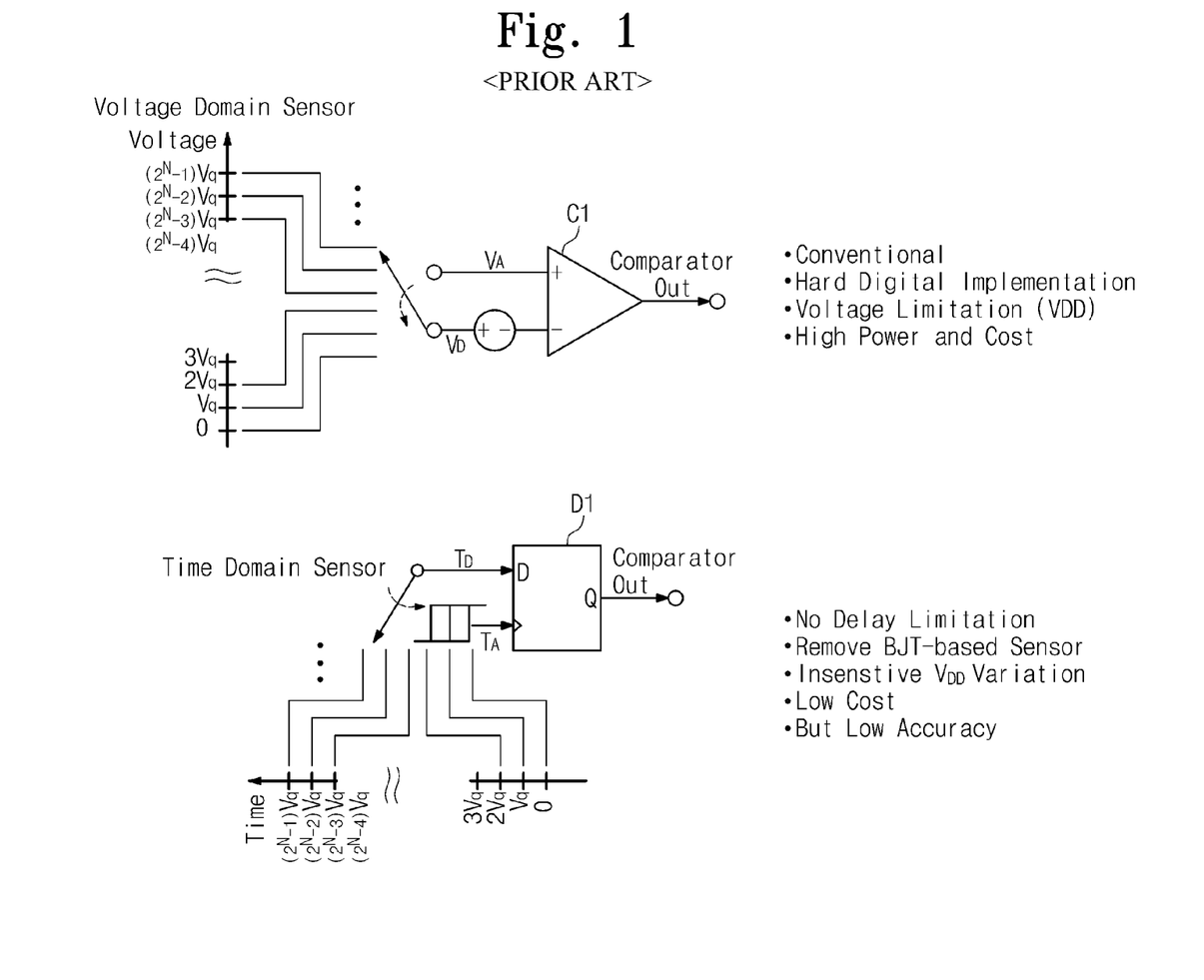
FIG. 1 is a view illustrating a comparison of operation concept of conventional voltage-domain temperature sensor and conventional time-domain temperature sensor.

FIG. 1 is a view illustrating a comparison of operation concept of conventional voltage-domain temperature sensor and conventional time-domain temperature sensor.

As illustrated in an upper portion of FIG. 1, the voltage-domain temperature sensor has a structure obtaining a temperature sensing output through a comparator C1. In a voltage-domain temperature sensor based on a BJT, an output of temperature sensor is different depending on a process deviation. Thus, an output of temperature sensor is different between chips of temperature sensor. Also, there is a problem that an analog circuit is complicated and power consumption is high.

As illustrated in a lower portion of FIG. 1, a time-domain temperature sensor has a structure obtaining a temperature sensing output through a flip-flop D1. In the time-domain temperature sensor, the chip is relatively less complicated and a low power characteristic is relatively good. Since the time-domain temperature sensor adopts relatively a lot of digital circuits, it has an advantage when integrating a chip. Therefore, a study of the time-domain temperature sensor is more actively underway as compared with the voltage-domain temperature sensor.

However, since the time-domain temperature sensor and the voltage-domain temperature sensor need a post calibration for two temperature points, production costs increase.

The time-domain temperature sensor needs a temperature output compensation circuit for improving an accuracy of temperature output. Since an adoption of the temperature output compensation circuit requires a high cost, it is not easy to adopt the temperature output compensation circuit. Moreover, since the time-domain temperature sensor needs an external reference clock signal, circuit complexity of temperature sensor module may increase.

SUMMARY

Embodiments of the inventive concept provide a digital temperature sensor based on oscillator. The digital temperature sensor based on oscillator may a first oscillator generating a first output signal having a first temperature characteristic; a second oscillator generating a second output signal having a second temperature characteristic different from the first temperature characteristic; and a time digital convertor outputting a digital signal for which a temperature output is compensated using the first and second output signals.

Embodiments of the inventive concept also provide a digital temperature sensor based on oscillator. The digital temperature sensor based on oscillator may a first oscillator generating a nonlinear first output signal having a temperature proportion output characteristic; a second oscillator generating a nonlinear second output signal having a temperature independent output characteristic; and a time digital convertor outputting a digital signal for which a nonlinear distortion is compensated using the first and second output signals.

Embodiments of the inventive concept also provide a method of sensing a temperature. The method may include preparing a first oscillator having a frequency change in proportion to a temperature change and a second oscillator insensitive to a temperature change; and counting an output frequency of the second oscillator by an output frequency of the first oscillator to output a digital code which is output-compensated itself.

BRIEF DESCRIPTION OF THE FIGURES

Preferred embodiments of the inventive concept will be described below in more detail with reference to the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Figure 2:
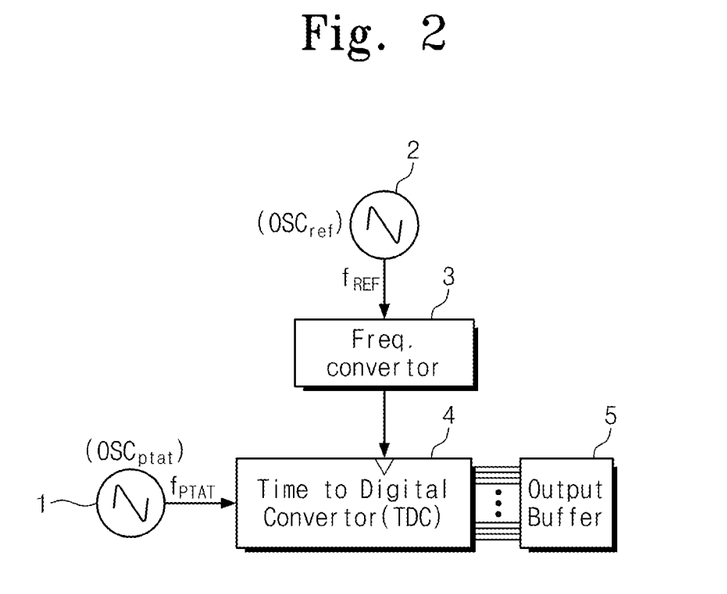
FIG. 2 is a block diagram of temperature sensor circuit based on an oscillator in accordance with some embodiments of the inventive concept.

FIG. 2 is a block diagram of temperature sensor circuit based on an oscillator in accordance with some embodiments of the inventive concept.

Referring to FIG. 2, the temperature sensor circuit based on an oscillator includes a first oscillator 1, a second oscillator 2 and a time digital convertor 4.

The first oscillator 1 is a proportional to absolute temperature oscillator (OSCptat) generating a first output signal proportional to a temperature change.

The second oscillator 2 is a reference oscillator (OSCref) generating a second output signal insensitive to a temperature change.

The time digital convertor 4 is a time to digital convertor (TDC) outputting a digital signal using the first and second output signals.

A frequency convertor 3 for converting a frequency of the second output signal may be set between the second oscillator 2 and the time digital convertor 4.

An output buffer 5 illustrated in FIG. 2 performs a function of buffering a digital signal of the time digital convertor 4. In some cases, the output buffer 5 may perform a function of latching the digital signal by including a latch circuit.

The temperature sensor circuit based on an oscillator has a structure obtaining a relative difference as an output by comparing signals being output through an oscillator insensitive to a temperature change and an oscillator having a frequency change proportional to a temperature change. Thus, the temperature sensor circuit based on an oscillator performs temperature output compensation itself. Comparing output frequencies of the two oscillators with each other is of help to improvement of external environment output distortion and improvement of temperature nonlinearity.

Figure 3:
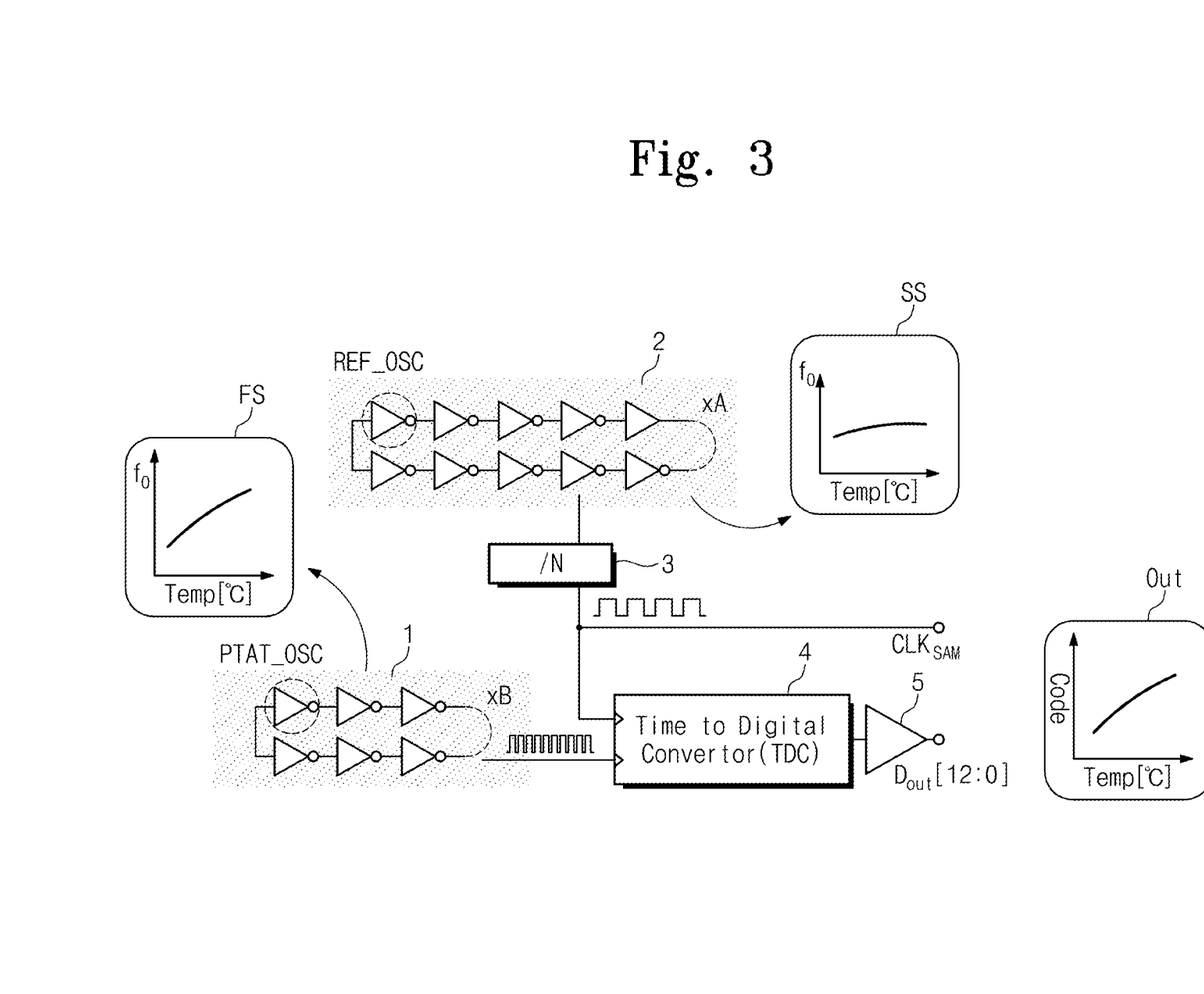
FIG. 3 is a view suggested for explaining a sensing output calculation in accordance with FIG. 2.

FIG. 3 is a view suggested for explaining a sensing output calculation in accordance with FIG. 2.

Referring to FIG. 3, the first oscillator 1 generates a first output signal FS as an output frequency in proportional to a temperature change. That is, an output frequency OSC ptat of the first output signal FS increases in proportional to an increase of temperature. The first oscillator 1 may be implemented in a ring oscillator including a plurality of stages.

The second oscillator 2 generates a second output signal SS as an output frequency insensitive to a temperature change. That is, even if a temperature rises, an output frequency OSCref of the second output signal SS is not greatly increased. The second oscillator 2 may be implemented in a ring oscillator including a plurality of stages.

The output frequency OSCptat of the first output signal FS is provided as a clock signal of the time digital convertor 4.

The output frequency OSCref of the second output signal SS is provided as a reference signal (an input signal, a counting target signal) of the time digital convertor 4.

Since the time digital convertor 4 counts a period of the reference signal as the clock signal, the first output frequency OSCptat should be higher than the second output frequency OSCref. A ratio of the first output frequency OSCptat to the second output frequency OSCref is a digital value of output signal Dout.

That is, it becomes that OSC ptat/OSCref=Dout.

For example, if the first output frequency OSCptat is 10 MHz and the second output frequency OSCref is 10 KHz, the output signal Dout is expressed by a digital code "1000".

Thus, a digital output resolution becomes Max(OSCptat/OSCref)−Min(OSCptat/OSCref) and a difference between the first output frequency OSCptat and the second output frequency OSCref should be great to increase an output resolution (the number of output bits, Dout) of the temperature sensor.

To increase a difference between the first output frequency OSCptat and the second output frequency OSCref, as illustrated in FIG. 3, a frequency divider 3 may be adopted to a circuit of FIG. 3 as a frequency convertor. When the frequency divider 3 is inserted as a divider 1N (N is an integer of 1 or more), an output resolution increases N times as follows.

That is, it becomes that N*OSCptat/OSCref=Dout.

In case of ring oscillator, an output frequency of ring oscillator may be represented as follows according to a difference of stage.

That is, fosc=$\eta I_D/2SC_L V_{dd}$ ($\eta$ is a fixed variable of ring oscillator, S is the number of stages, $V_{dd}$ is a voltage source, $I_D$ is core current, $C_L$ is load capacitance).

If it is assumed that a stage internal circuit of ring oscillator in the two oscillators is equal to each other, an output resolution of temperature sensor can be defined as follows.

$$A/B=Dout$$

A is the number of stages of the first oscillator 1 and B is the number of stages of the second oscillator 2.

The first output frequency OSCptat may be higher than the second output frequency OSCref, and vice versa.

According to an operation principle described above, in FIG. 3, a digital code of 13 bits having an output characteristic such as a graph output OUT can be obtained as an output signal Dout through a latch and an output buffer 5.

In case of FIG. 3, a frequency divider dividing a frequency of the first output signal is adopted but when a frequency of the first signal is too high, a frequency multiplier may be adopted.

Figure 4:
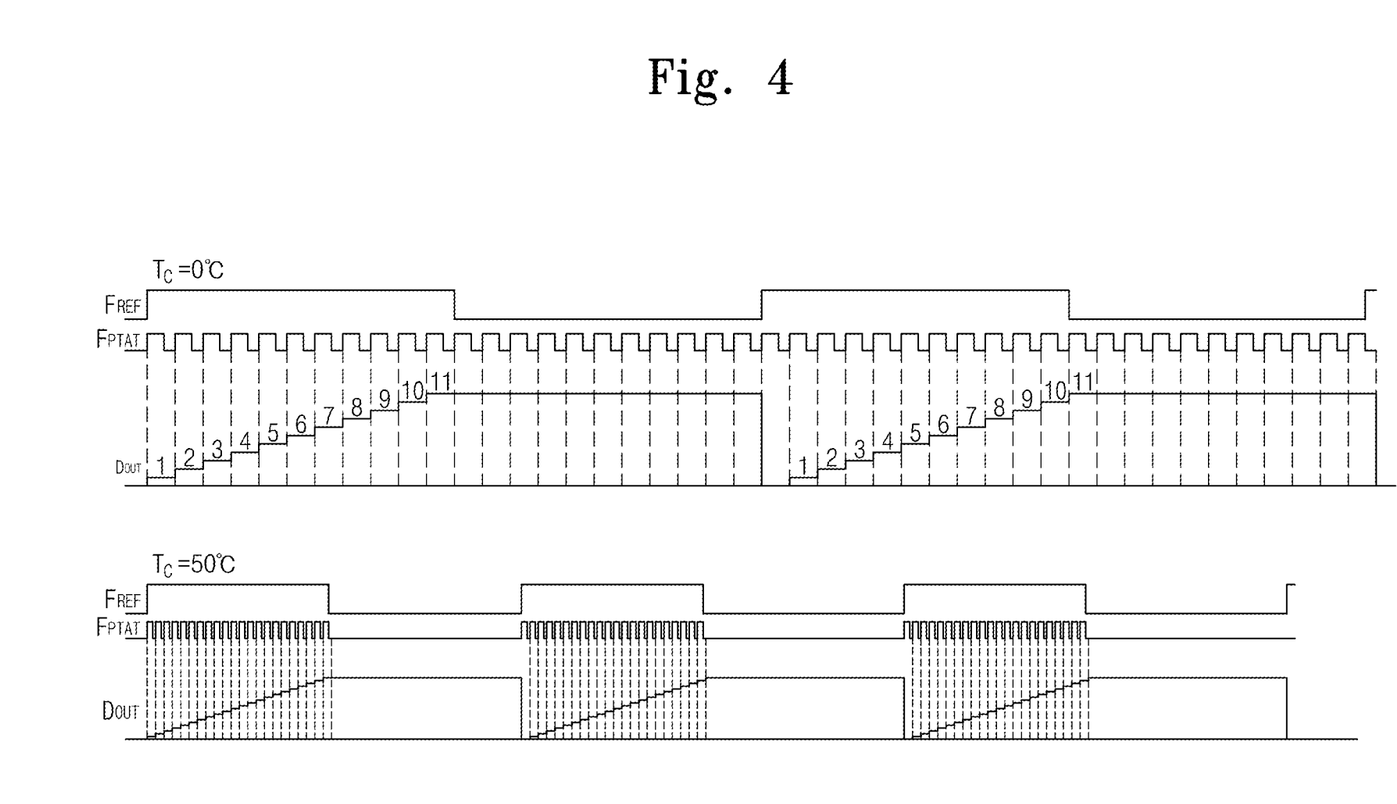
FIG. 4 is a timing diagram illustrating input/output characteristics of different temperatures from each other in the circuit of FIG. 2.

FIG. 4 is a timing diagram illustrating input/output characteristics of different temperatures from each other in the circuit of FIG. 2.

In FIG. 4, a waveform Fref indicates a frequency waveform of the second output frequency OSCref and a waveform Fpatat indicates a frequency waveform of the first output frequency OSCpata. A waveform Dout indicates an output code waveform of the time digital convertor (TDC) 4.

In case of FIG. 4, input/output waveforms according to two temperatures are contrasted with each other. That is, in 0° C., an input/output waveform is illustrated in an upper portion of the drawing. In 50° C., an input/output waveform is illustrated in a lower portion of the drawing.

When a temperature increases from 0° C. to 50° C., the first and second output frequencies all increase. In this case, an increasing variable width (slope) of the first output frequency OSCpata is far greater than an increasing variable width (slope) of the second output frequency OSCref. Thus, the output Dout of the time digital convertor (TDC) 4 increases according to a temperature change.

Since the tow oscillators has a structure obtaining an output on the basis of a relative temperature change of output frequency, objects of the inventive concept is accomplished.

Figure 5:
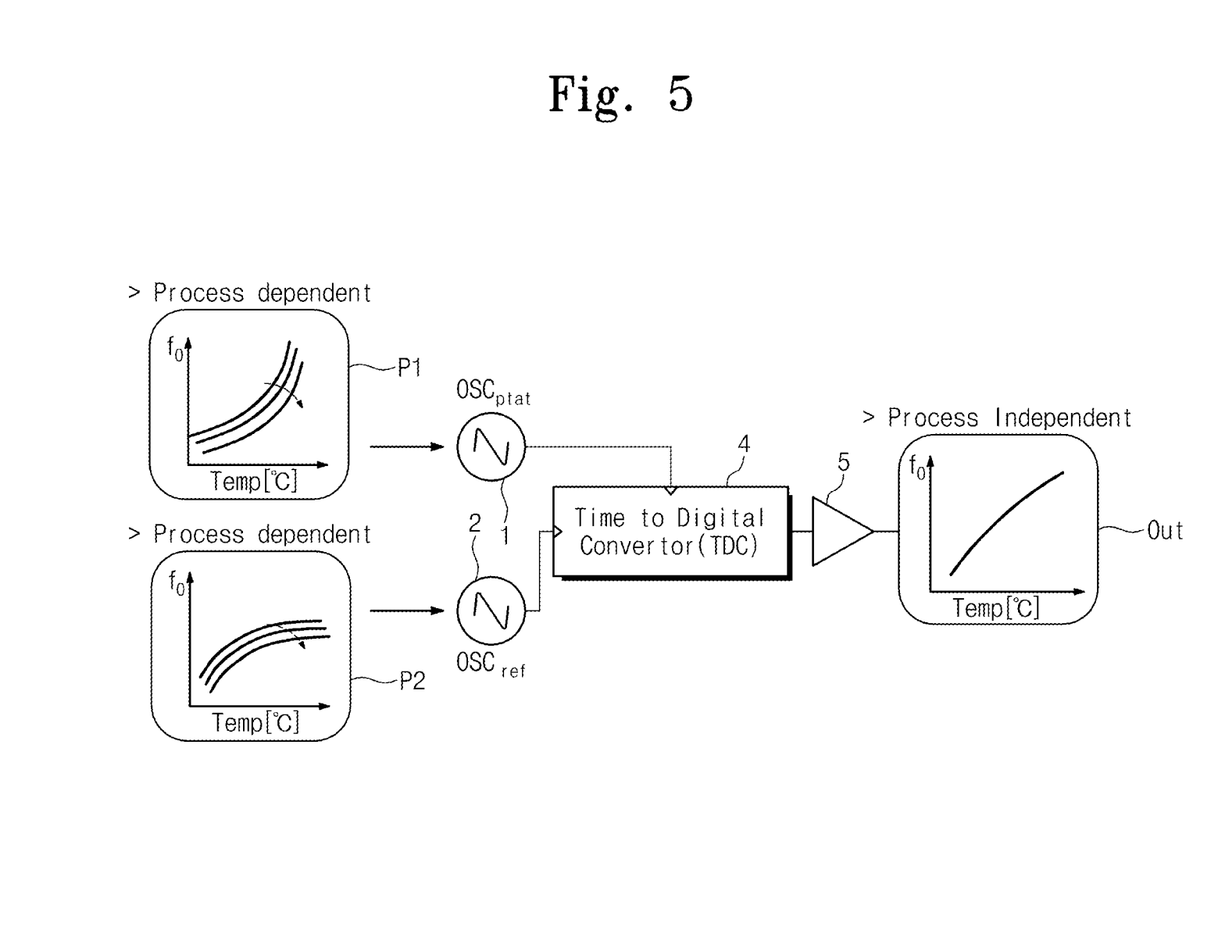
FIG. 5 is a view suggested for explaining a process deviation compensation principle in the circuit of FIG. 2.

FIG. 5 is a view suggested for explaining a process deviation compensation principle in the circuit of FIG. 2.

Referring to FIG. 5, output signals P1 and P2 of the first and second oscillators 1 and 2 changed depending on a process change and an external environment change are illustrated.

The output signals of the two oscillators have a change in an output frequency and a rate of frequency change. An output performance deviation of temperature sensor may cause a problem that a lot of time and costs are required for a post calibration. However, in the output signals P1 and P2 of FIG. 5, an output change depending on a process change and an external environment change has the same direction. Thus, a change of output value of temperature sensor is not great like the output signal OUT.

The time-domain temperature sensor based on oscillator in accordance with the inventive concept provides an advantage that a post calibration is not required or minimized.

An additional advantage in the relative signal comparison method in accordance with the inventive concept is as follows.

A temperature sensor should have a characteristic that an output is linearly proportional to a temperature change. A nonlinear characteristic is due to an error of temperature slope. The time-domain temperature sensor in accordance with the inventive concept offsets a nonlinear distortion component occurring in one oscillator by a nonlinear distortion component occurring in the other oscillator. Therefore, a temperature output error rate may be improved.

Figure 6:
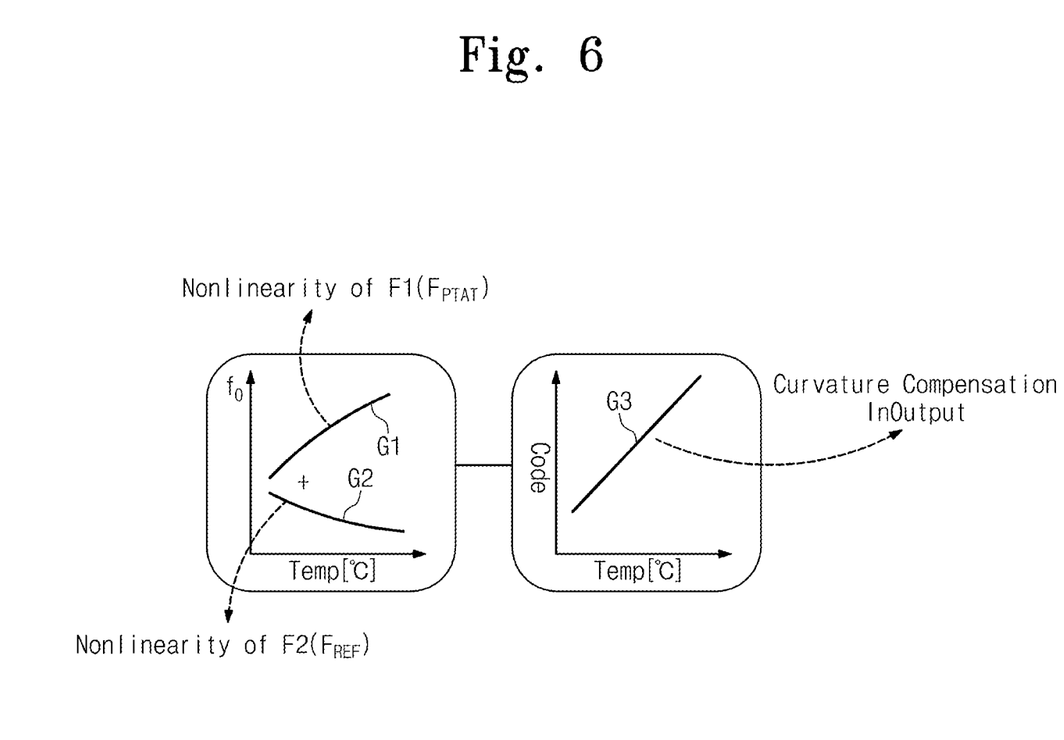
FIG. 6 is a view suggested for explaining a nonlinearity compensation principle of temperature characteristic in the circuit of FIG. 2.

FIG. 6 is a view suggested for explaining a nonlinearity compensation principle of temperature characteristic in the circuit of FIG. 2.

Referring to FIG. 6, a distortion compensation principle of temperature sensor in accordance with is represented through graphs G1, G2 and G3.

The graph G1 represents a nonlinear frequency output related to the first output signal Fptat of the first oscillator 1.

The graph G2 represents a nonlinear frequency output related to the second output signal Fref of the second oscillator 2.

The graph G3 represents a distortion compensated linear output of the time digital convertor 4.

The nonlinearity of the first output signal Fptat can be offset by the complementary nonlinearity of the second output signal Fref. However, since a nonlinearity of high frequency is stronger than a nonlinearity of low frequency, greater distortion compensation should be performed on a nonlinearity of low frequency. As a result, an output of temperature sensor can be obtained as an output linearly proportional to a temperature change.

The time-domain temperature sensor based on oscillator in accordance with the inventive concept uses an internal clock without an external clock source while a general temperature sensor needs an external clock source. Thus, a temperature sensor module is simple and can be miniaturized.

According to some embodiments of the inventive concept, since temperature output compensation is made itself, a temperature sensor insensitive to a process deviation is obtained. Since relatively comparing an output characteristic using two oscillators, an error rate of temperature output is improved. Since a temperature sensor operates in a time domain, it has advantages that a circuit is simple, a low power characteristic is superior and it is advantageous in digitalization. Thus, the temperature sensor based on oscillator in accordance with some embodiments of the inventive concept can be used in temperature environment detection for all different fields because it is embodied with a relatively low cost and has a relatively superior low power characteristic.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. A digital temperature sensor comprising:
    a first oscillator generating a first output signal having a first temperature characteristic;
    a second oscillator generating a second output signal having a second temperature characteristic different from the first temperature characteristic; and
    a time digital convertor outputting a digital signal using the first and second output signals, the digital signal indicating a temperature of the digital temperature sensor,
    wherein the first temperature characteristic of the first oscillator indicates a frequency of the first output signal that increases in proportion to an increase of the temperature and the second temperature characteristic of the second oscillator indicates a frequency of the second output signal that changes insensitively to a temperature change compared to the first temperature characteristic, and the second temperature characteristic of the second oscillator indicates the frequency of the second output signal that increases in proportion to the increase of the temperature and the first temperature characteristic of the first oscillator indicates the frequency of the first output signal that changes insensitively to the temperature change compared to the second temperature characteristic.

2. The digital temperature sensor of claim 1, wherein when the first output signal acts as a counting clock signal, the frequency of the first output signal is higher than the frequency of the second output signal.

3. The digital temperature sensor based on oscillator of claim 1, wherein when the second output signal acts as a counting clock signal, the frequency of the first output signal is lower than the frequency of the second output signal.

4. The digital temperature sensor of claim 1, wherein the time digital convertor receives the first output signal as a clock signal and receives the second output signal as a reference signal that corresponds to a counting target signal.

5. The digital temperature sensor of claim 1, further comprising a frequency convertor dividing the frequency of the first output signal and coupled between the first oscillator and the time digital convertor or dividing the frequency of the second output signal and coupled between the second oscillator and the time digital convertor.

6. The digital temperature sensor of claim 5, wherein when the frequency of the first output signal is equal to the frequency of the second output signal and the first output signal acts as a counting clock signal, the frequency of the second output signal is divided by the frequency convertor.

7. The digital temperature sensor of claim 5, further comprising an output buffer buffering the digital signal of the time digital convertor.

8. The digital temperature sensor of claim 7, further comprising a latch latching the digital signal and coupled between the time digital convertor and the output buffer.

9. A digital temperature sensor comprising:
    a first oscillator generating a nonlinear first output signal having a temperature proportionate output characteristic;
    a second oscillator generating a nonlinear second output signal having a temperature independent output characteristic; and a time digital convertor outputting a digital signal using the first and second output signals, the digital signal indicating a temperature of the digital temperature sensor and having a value that is linearly proportional to a temperature change.

10. The digital temperature sensor of claim 9, wherein the first oscillator is a ring oscillator including a plurality of stages.

11. The digital temperature sensor of claim 9, wherein the second oscillator is a ring oscillator including a plurality of stages.

12. The digital temperature sensor of claim 9, wherein when the first output signal acts as a counting clock signal, a frequency of the first output signal is higher than a frequency of the second output signal.

13. The digital temperature sensor of claim 9, wherein the time digital convertor measures a period of the second output signal based on the first output signal to output the digital signal having the value expressed by a digital code.

14. The digital temperature sensor of claim 9, wherein the temperature proportionate output characteristic indicates that a frequency of the first output signal increases in proportion to an increase of the temperature and the temperature independent output characteristic indicates that a frequency of the second output signal changes insensitively to a temperature change compared to the temperature proportionate output characteristic.

15. The digital temperature sensor of claim 9, wherein when the second output signal acts as a counting clock signal, a frequency of the first output signal is lower than a frequency of the second output signal.

16. The digital temperature sensor of claim 9, further comprising a frequency convertor dividing the frequency of the first output signal and coupled between the first oscillator and the time digital convertor or dividing the frequency of the second output signal and coupled between the second oscillator and the time digital convertor.

17. The digital temperature sensor of claim 16, wherein when the frequency of the first output signal is equal to the frequency of the second output signal and the first output signal acts as a counting clock signal the frequency of the second output signal is divided by the frequency convertor.

18. The digital temperature sensor of claim 16, further comprising an output buffer buffering the digital signal of the time digital convertor.

19. The digital temperature sensor based on oscillator of of claim 18, further comprising a latch latching the digital signal and coupled between the time digital convertor and the output buffer.

* * * * *